W. R. CLARK.
JOURNAL BOX BEARING FOR RAILWAY CARS.
APPLICATION FILED APR. 13, 1908.
992,481.
Patented May 16, 1911.
2 SHEETS—SHEET 1.
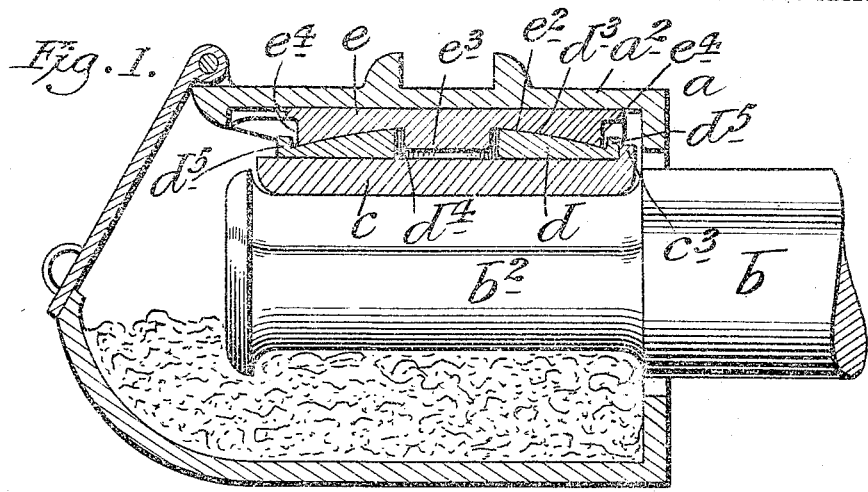
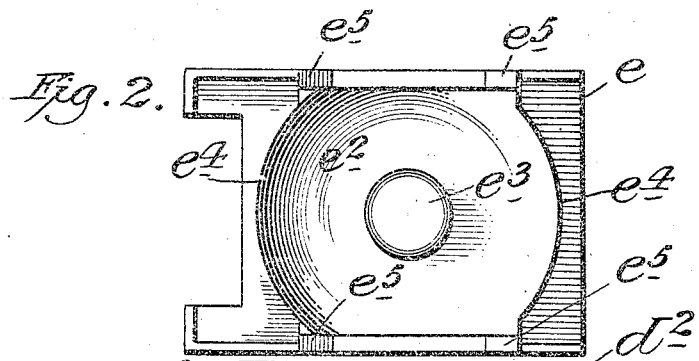
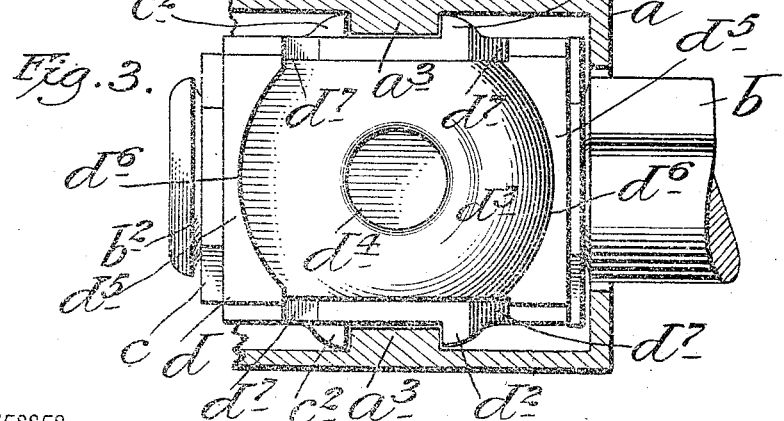
WITNESSES
INVENTOR
William R. Clark,
BY
Edgar Tate & Co.
ATTORNEYS.

W. R. CLARK.
JOURNAL BOX BEARING FOR RAILWAY CARS.
APPLICATION FILED APR. 13, 1908.
992,481.
Patented May 16, 1911.
2 SHEETS—SHEET 2.
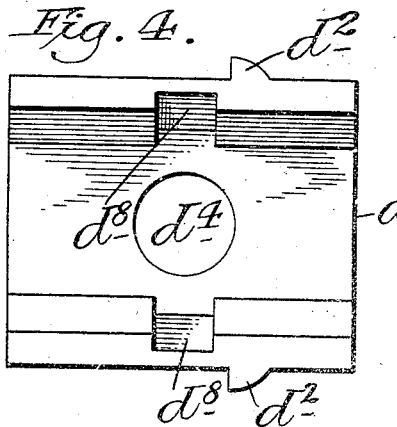
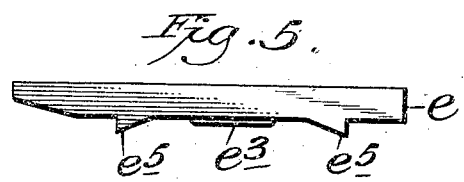
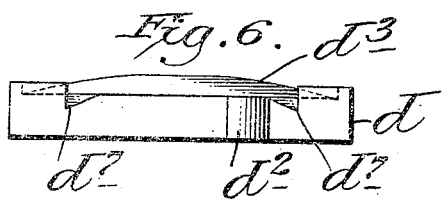
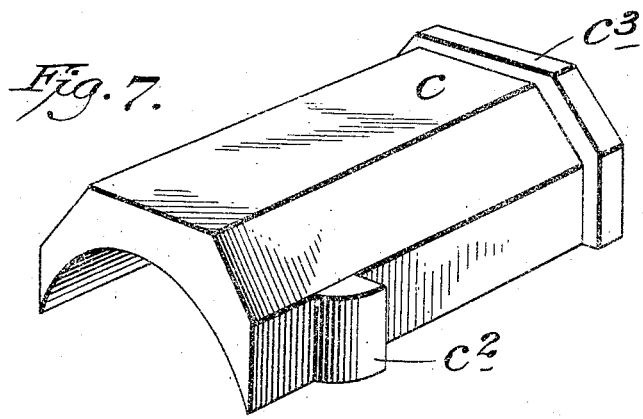
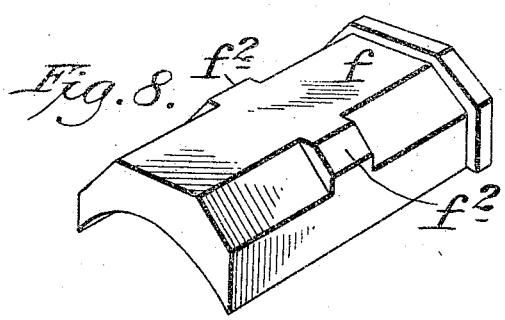
WITNESSES
INVENTOR
William R. Clark,
BY
ATTORNEYS.

UNITED STATES PATENT OFFICE.

WILLIAM R. CLARK, OF JERSEY CITY, NEW JERSEY.

JOURNAL-BOX BEARING FOR RAILWAY-CARS.

992,481.   Specification of Letters Patent.   Patented May 16, 1911.

Application filed April 13, 1908. Serial No. 426,705.

*To all whom it may concern:*

Be it known that I, WILLIAM R. CLARK, a citizen of the United States, and residing at Jersey City, in the county of Hudson and State of New Jersey, have invented certain new and useful Improvements in Journal-Box Bearings for Railway-Cars, of which the following is a specification, such as will enable those skilled in the art to which it appertains to make and use the same.

This invention relates to journal box bearings for railway cars, and the object thereof is to provide an improved bearing of this class which will permit of all the necessary movement of the separate parts on the journal of an axle and on each other with a minimum amount of friction, and in which the separate parts of the bearing will be securely held in proper position at all times;
a further object being to provide a bearing for the journal of a car axle which may be used in the standard journal box without any change whatever in the construction thereof or in the construction of the base member or block of the bearing, and in which the "wedge" members of the bearing have a rotatable, longitudinal and transverse movement one upon the other.

My improved bearing for railway journal boxes comprises a top member, an intermediate member and a bottom or base member which rests on the spindle, said parts being of novel construction as hereinafter described, and the invention is fully disclosed in the following specification, of which the accompanying drawings form a part, in which the separate parts of my improvement are designated by suitable reference characters in each of the views, and in which;—

Figure 1 is a longitudinal vertical sectional view of a journal box and bearing made according to my invention; Fig. 2 a bottom plan view of the top bearing member which I employ; Fig. 3 a sectional plan view of the box and showing the journal of the axle passing therethrough, and showing the main or base bearing member resting on the journal, and the intermediate bearing member resting thereon; Fig. 4 a bottom plan view of the intermediate bearing member; Fig. 5 a side view of the top bearing member; Fig. 6 a side view of the intermediate bearing member; Fig. 7 a perspective view of a base bearing member of the usual form which may be employed in connection with my improved top and intermediate bearing members, and;—Fig. 8 a view similar to Fig. 7 of an improved form of bottom or base bearing member which I may employ in place of that shown in Fig. 7.

In the drawings forming part of this specification, I have shown at $a$ an ordinary railway journal box, and at $b$ one end of an axle the journal $b^2$ of which passes into the box $a$. The box $a$ is provided with the usual top $a^2$, and said box, in practice, is connected with the truck or frame work of a car in the usual manner.

My improved bearing consists of three separate parts, a bottom block or member $c$, an intermediate block or member $d$ and a top block or member $e$, and my invention consists in the form and construction of said blocks or members, and particularly in the form and construction of the top block or member $e$ and the intermediate block or member $d$. The use of three bearing blocks or members in bearings of this class is not broadly new, and in Fig. 7 I have shown a bottom block or member $c$ of the usual form, and in Fig. 8 a bottom block or member $f$ of improved construction which may be substituted for the block or member shown in Fig. 7, but I will first describe my improvement in connection with the bottom block or member shown in Fig. 7.

The opposite sides of the journal box $a$ are provided on their inner sides with vertically arranged ribs or projections $a^3$, and the bottom block or member $c$ is provided on its opposite sides with lugs or projections $c^2$ which engage the outer side faces of the ribs or projections $a^3$, while the intermediate block or member $d$ is provided with lugs or projections $d^2$ which engage the inner side faces of the ribs or projections $a^3$, all these features being of the usual form and construction.

The central top portion of the intermediate block or member $d$ is convex in cross section as shown at $d^3$ except at the sides and ends, and centrally thereof is a circular opening $d^4$, and at the opposite or inner and outer ends thereof are raised transverse stops $d^5$ the inner edges or faces of which are concave as shown at $d^6$, and in the corner portions and top side thereof are recesses $d^7$.

The central bottom portion of the top member or block $e$ is concave in cross section as shown at $e^2$, and at the center thereof is a circular projection $e^3$ adapted to enter the circular opening $d^4$ in the intermediate block or member $d$, and at the inner and outer ends of the concave bottom portion thereof are convex shoulders or projections $e^4$ adapted to abut against the convex shoulders or stops $d^5$ at the inner and outer ends of the said intermediate block or member $d$, and the top block or member $e$ is also provided on the bottom side portions thereof with teeth or projections $e^5$ adapted to enter the recesses $d^7$ in the opposite side and corner portions of the intermediate block or member $d$.

It will be seen that the circular projection $e^3$ on the bottom of the top block or member $e$ is of less dimensions than the circular opening $d^4$ in the intermediate block or member $d$, and the distance between the convex shoulders or projections $e^4$ of the top block or member $e$ is less than the distance between the concave shoulders or projections $d^5$ on the intermediate block or member $d$, and the said top block or member $e$ is thus free to move in all directions on the intermediate block or member $d$, and the shape or formation of the teeth or projections $e^5$ on the top block or member $e$ and the recesses $d^7$ in the intermediate block or member $d$ is such as to permit of this operation.

The bottom block or member $c$ is provided at its inner end, and on the top and sides thereof with a raised stop or shoulder $c^3$ against which the inner end of the intermediate block or member $d$ abuts, and said intermediate block or member $d$ is also capable of moving longitudinally of the bottom block or member $c$ to a slight extent, while the said bottom member $c$ rests on the journal $b^2$ of the axle $b$ in the usual manner, and is movable longitudinally on said journal to a slight extent.

It will also be seen from Fig. 1 of the drawing that the top block or member $e$ is shorter than the top $a^2$ of the journal box which rests thereon, and all the parts of my improved bearing are movable to a slight extent longitudinally of each other, and the top block or member $e$ is also capable of a slight rotary movement on the intermediate block or member $d$, and the longitudinal movement of the top block or member $e$ on the intermediate block or member $d$ is limited, as will be seen, by the central projection $e^3$ on the bottom thereof, the convex shoulders or stops $e^4$ at the end portions thereof operating in connection with the convex shoulders or stops $d^5$ at the opposite ends of the intermediate block or member $d$, and by the teeth or projections $e^5$ on the top block or member $e$ operating in the recesses $d^7$ in the intermediate block or member $d$ as is also the rotary movement of the intermediate block or member $e$; but while I have thus shown three different means for limiting the movement of the top block or member $e$ on the intermediate block or member $d$ it will be apparent that all three of these means need not necessarily be employed, for instance the central downwardly directed projection $e^3$ of the top block or member $e$ operating in the opening $d^4$ in the intermediate block or member $d$ may be employed alone for this purpose, or it may be employed in connection with the end shoulders or stops $e^4$ and $d^5$ of said blocks or members, or in connection with the teeth or projections $e^5$ and the recesses $d^7$ of said blocks or members.

In Fig. 8 I have shown at $f$ a modified form of bottom block or member which may be substituted for the bottom block or member shown in Fig. 7, and the bottom block or member $f$ is of less vertical depth than the bottom block or member $c$ and by reason of this fact there is less friction on the journal $b^2$ when the form of bottom block or member $f$ is employed. When this form of bottom block or member $f$ is employed the opposite sides thereof are provided centrally thereof with lugs or projections $f^2$, and the opposite inner sides of the intermediate block or member $d$ are provided with recesses $d^8$ to receive said lugs or projections and the top block or member $e$ and intermediate block or member $d$ are placed in position on the said bottom block or member $f$ exactly as when the bottom block or member $c$ is employed.

The parts $e$ and $d$ of my improved bearing constitute what are known as the "wedge" members of a bearing of this class, and constructed as described said parts have a rotatable, longitudinal and transverse movement one upon the other, and this is one of the chief advantages of my invention and is impossible with any bearings of this class as heretofore constructed.

One of the chief features of my improvement is found in the fact that the journal box in connection with which my improved bearing is employed is a standard journal box, and the top $a^2$ is also of standard construction, and no changes whatever are made in these features. The top member $e$ of the bearing proper is also movable longitudinally in the top of the journal box, and the top and intermediate members $d$ and $e$ of the bearing proper are movable longitudinally, transversely and rotatably one upon the other, while the top surface of the bottom member $c$ and the bottom surface of the intermediate member $d$ of the bearing proper are made up of plane surfaces which are the same as the plane top surface of any standard bottom member of a bearing of this class, and by means of this construction I provide a journal box and box bearing of the class specified which permits of all the necessary movement of the separate parts, and also reduces the friction to a minimum, and the construction of which is such that the separate parts of the bearing while being freely movable one upon another are also prevented from separation without interfering with the necessary movement thereof.

Having fully described my invention what I claim as new and desire to secure by Letters Patent, is:—

1. In a bearing of the class described, the combination with a journal box having its top provided with a plane under surface, of a bottom bearing member, an intermediate bearing member and a top bearing member, the intermediate bearing member being provided with a spherically convex top and the top member being correspondingly concave on its under side, said top and intermediate members being rotatably, longitudinally and transversely movable one upon another, and the top member being movable longitudinally in the top of the said box, said intermediate member being also provided centrally with a circular opening, and the top member being provided centrally of its under side with a circular projection adapted to enter said opening and of less diameter than said opening.

2. In a bearing of the class described, a journal box having a top bearing member, a bottom bearing member and an intermediate bearing member, the engaging surfaces of the intermediate bearing member and the said top bearing member being the one of a convex and the other a corresponding concave contour, means for limiting direct longitudinal and transverse movements of said parts in respect to each other consisting of a central opening in one part engaging a projection of less size on the other, one of said members having also recesses at each end on each side, and the other having projections loosely engaging the same to permit oscillating movements of said parts in every direction in respect to each other, and to limit such movements.

3. In a bearing of the class described, the combination with a journal box having its top provided with a plane under surface, of a bottom bearing member, a top bearing member, and an intermediate bearing member, the said top member having a concave under surface, and the said intermediate member having a correspondingly convex upper surface to engage the same, the said top member and intermediate member being centrally connected by an opening in one part and a projection of less size from the other part entering the same, the said intermediate member having recesses on each side near each end and the said top member having projections loosely engaging each of said recesses, whereby movement between said parts in all directions is permitted and the oscillating movements limited by the said recesses and projections.

4. In a bearing of the class described, the combination with a journal box having its top provided with a plane under surface, of a bottom bearing member, a top member and an intermediate member, the said top member having a spherically concave under surface and the intermediate member having a corresponding convex upper surface to engage the same providing for an oscillating movement in every direction of one in respect to the other, the said intermediate member having depressed side portions with recesses at each end inclining or curving upward toward the center, and the said top member having corresponding side portions extending downward to engage the depressed side portions of the intermediate member and projections for engaging the said recesses of the intermediate member, said side portions, recesses and projections permitting the said relative movements of the parts but limiting the amount of such movements.

In testimony that I claim the foregoing as my invention I have signed my name in presence of the subscribing witnesses this 11th day of April 1908.

WILLIAM R. CLARK.

Witnesses:
C. E. MULREANY,
M. E. DOODY.